(12) United States Patent
Huang (10) Patent No.: US 11,812,486 B2
(45) Date of Patent: Nov. 7, 2023

(54) WI-FI CONNECTION CONTROL METHOD AND RELATED PRODUCTS

(71) Applicant: GUANGDONG OPPO MOBILE TELECOMMUNICATIONS CORP., LTD., Guangdong (CN)

(72) Inventor: Yuan Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 45 days.

(21) Appl. No.: 17/591,587

(22) Filed: Feb. 2, 2022

(65) Prior Publication Data

US 2022/0159762 A1    May 19, 2022

Related U.S. Application Data

(63) Continuation of application No. PCT/CN2020/104089, filed on Jul. 24, 2020.

(30) Foreign Application Priority Data

Aug. 16, 2019 (CN) .......................... 201910759326.5

(51) Int. Cl.
*H04W 76/15* (2018.01)
*H04W 76/30* (2018.01)
(Continued)

(52) U.S. Cl.
CPC ........... *H04W 76/15* (2018.02); *H04W 12/06* (2013.01); *H04W 76/30* (2018.02); *H04W 84/12* (2013.01)

(58) Field of Classification Search
CPC ..................... H04W 88/08; H04W 36/00835
(Continued)

(56) References Cited

U.S. PATENT DOCUMENTS

2009/0034457 A1* 2/2009 Bahl ...................... H04W 16/10
370/329
2010/0029215 A1 2/2010 Honkanen et al.
(Continued)

FOREIGN PATENT DOCUMENTS

| CN | 104994513 | 10/2015 |
| CN | 105592504 | 5/2016 |

(Continued)

OTHER PUBLICATIONS

CNIPA, First Office Action for CN Application No. 201910759326.5, dated Feb. 3, 2021.
(Continued)

*Primary Examiner* — Kiet M Doan
(74) *Attorney, Agent, or Firm* — Hodgson Russ LLP (57) ABSTRACT

A wireless fidelity (Wi-Fi) connection control method and related products are provided, which are applied to an electronic device. The electronic device supports dual Wi-Fi and includes a Wi-Fi communication module. The electronic device accesses a first access point (AP) and a second AP through the Wi-Fi communication module in a dual Wi-Fi state. A first frequency band of the first AP is different from a second frequency band of the second AP. The method includes the following. A resource conflict between a third AP and the second AP is detected. In response to the detected resource conflict between the third AP and the second AP, a connection between the electronic device and the second AP is released.

15 Claims, 7 Drawing Sheets

Detecting, by an electronic device, existence of a resource conflict between a third AP and a second AP in response to detecting that the electronic device roams from a first AP to the third AP — S101

Releasing, by the electronic device, a connection between the electronic device and the second AP in response to detecting that the resource conflict exists between the third AP and the second AP — S102

(51) Int. Cl.
*H04W 12/06* (2021.01)
*H04W 84/12* (2009.01)

(58) Field of Classification Search
USPC ............ 455/404.1, 436, 456.2; 370/310, 331
See application file for complete search history.

(56) References Cited

U.S. PATENT DOCUMENTS

| | | |
|---|---|---|
| 2014/0050146 A1 | 2/2014 | Chrisikos et al. |
| 2015/0264602 A1 | 9/2015 | Hageltorn et al. |
| 2017/0064595 A1 | 3/2017 | Chang |
| 2018/0206166 A1 | 7/2018 | Ganesan et al. |
| 2019/0166636 A1* | 5/2019 | Sahu ................ H04W 88/10 |
| 2021/0219212 A1* | 7/2021 | Morioka ............ H04W 48/16 |

FOREIGN PATENT DOCUMENTS

| | | |
|---|---|---|
| CN | 105848231 | 8/2016 |
| CN | 106253923 | 12/2016 |
| CN | 106376054 | 2/2017 |
| CN | 106658522 | 5/2017 |
| CN | 106792823 | 5/2017 |
| CN | 107770841 | 3/2018 |
| CN | 107770842 | 3/2018 |
| CN | 108124056 | 6/2018 |
| CN | 108924902 | 11/2018 |
| CN | 109640310 | 4/2019 |
| CN | 109803318 | 5/2019 |
| CN | 110430592 | 11/2019 |

OTHER PUBLICATIONS

CNIPA, Second Office Action for CN Application No. 201910759326.5, dated Aug. 10, 2021.
WIPO, International Search Report for PCT/CN2020/104089, dated Oct. 29, 2020.
CNIPA, Third Office Action for CN Application No. 201910759326.5, dated Jan. 5, 2022.
CNIPA, Notice of allowance for CN Application No. 201910759326.5, dated Jan. 5, 2023.
CNIPA, Rejection for CN Application No. 201910759326.5, dated Apr. 25, 2022.
EPO, Extended European Search Report for EP Application No. 20855495.6, dated Aug. 23, 2022.
CNIPA, Reexamination Decision for CN Application No. 201910759326.5, dated Oct. 31, 2022.

* cited by examiner

FIG. 5

WI-FI CONNECTION CONTROL METHOD AND RELATED PRODUCTS

CROSS-REFERENCE TO RELATED APPLICATION(S)

This application is a continuation of International Application No. PCT/CN2020/104089, filed on Jul. 24, 2020, which claims priority to Chinese Patent Application No. 201910759326.5, filed on Aug. 16, 2019, the entire disclosures of which are incorporated herein by reference.

TECHNICAL FIELD

This disclosure relates to the field of electronic devices, and particularly to a wireless fidelity (Wi-Fi) connection control method and related products.

BACKGROUND

Nowadays, with the popularization of a wireless fidelity (Wi-Fi) function on mobile terminals such as mobile phones, users use Wi-Fi almost every day, and so the demand for Wi-Fi network speed is increasing. At present, hardware products that support dual Wi-Fi have been designed by chip manufacturers, which allow a mobile terminal to access two different wireless access points (AP) at the same time based on this hardware capability. When the two different wireless APs have a same frequency band, connections established using the two APs generally need to be time-division multiplexed, which however invalidates advantages of dual Wi-Fi concurrent work, thereby limiting an improvement effect of network acceleration.

SUMMARY

In a first aspect, implementations of the disclosure provide a wireless fidelity (Wi-Fi) connection control method. The method is performed by an electronic device. The electronic device supports dual Wi-Fi. The electronic device includes a Wi-Fi communication module. The electronic device accesses a first access point (AP) and a second AP through the Wi-Fi communication module in a dual Wi-Fi state. A first frequency band of the first AP is different from a second frequency band of the second AP. The method includes the following. A resource conflict between a third AP and the second AP is detected. In response to the detected resource conflict between the third AP and the second AP, a connection between the electronic device and the second AP is released.

In a second aspect, implementations of the disclosure provide an electronic device. The electronic device supports dual Wi-Fi. The electronic device includes a Wi-Fi communication module. The electronic device accesses a first AP and a second AP through the Wi-Fi communication module in a dual Wi-Fi state. A first frequency band of the first AP is different from a second frequency band of the second AP. The electronic device includes a processor and a memory. The memory is coupled to the processor and stores one or more programs. The programs include instructions which are operable with the processor to: detect that the electronic device roams from the first AP to a third AP; detect existence of a resource conflict between the third AP and the second AP; and release a connection between the electronic device and the second AP in response to detecting that the resource conflict exists between the third AP and the second AP.

In a third aspect, implementations of the disclosure provide a non-transitory computer-readable storage medium. The non-transitory computer-readable storage medium stores computer programs which, when executed by a processor, cause the processor to execute all or part of the operations of the method in the first aspect of the implementations of the disclosure.

BRIEF DESCRIPTION OF THE DRAWINGS

In order to describe technical solutions of implementations of the disclosure or the related art more clearly, the following will give a brief description of accompanying drawings used for describing the implementations or the related art. Apparently, accompanying drawings described below are merely some implementations. Those of ordinary skill in the art can also obtain other accompanying drawings based on the accompanying drawings described below without creative efforts.

DETAILED DESCRIPTION

In order for those skilled in the art to better understand technical solutions of the disclosure, technical solutions of implementations of the disclosure will be described clearly and completely with reference to accompanying drawings in the implementations. Apparently, implementations described hereinafter are merely some implementations, rather than all implementations of the disclosure. All other implementations obtained by those of ordinary skill in the art based on the implementations without creative efforts shall fall within the protection scope of the disclosure.

The terms "first", "second", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not listed; alternatively, other steps or units inherent to the process, method, product, or device can be included either.

The term "implementation" referred to herein means that particular features, structures, or properties described in conjunction with the implementations may be defined in at least one implementation of the disclosure. The phrase "implementation" appearing in various places in the specification does not necessarily refer to the same implementation or an independent/alternative implementation that is mutually exclusive with other implementations. Those skilled in the art will understand expressly and implicitly that an implementation described herein may be combined with other implementations.

"Electronic device" in implementations of the disclosure may include various handheld devices with wireless communication functions, on-board devices, wearable devices, computing devices, or other processing devices connected to a wireless modem, as well as various forms of user equipment (UE), mobile stations (MS), terminal device, etc.

Hereinafter, implementations of the disclosure will be described in detail.

According to implementations of the disclosure, a wireless fidelity (Wi-Fi) connection control method is provided. The method is performed by an electronic device. The electronic device supports dual Wi-Fi. The electronic device includes a Wi-Fi communication module. The electronic device accesses a first access point (AP) and a second AP through the Wi-Fi communication module in a dual Wi-Fi state. A first frequency band of the first AP is different from a second frequency band of the second AP. The method includes the following. A resource conflict between a third AP and the second AP is detected. In response to the detected resource conflict between the third AP and the second AP, a connection between the electronic device and the second AP is released.

In an implementation, the resource conflict between the third AP and the second AP is detected as follows. A third frequency band of the third AP is obtained. In response to the third frequency band being identical with the second frequency band, determine that the resource conflict exists between the third AP and the second AP.

In an implementation, a frequency band of the Wi-Fi communication module includes a 2.4 GHz frequency band and a 5 GHz frequency band.

In an implementation, the resource conflict between the third AP and the second AP is detected as follows. A channel quality of the third AP and a channel quality of the second AP are detected. In response to the channel quality of the third AP and the channel quality of the second AP being each less than a preset channel quality, determine that the resource conflict exists between the third AP and the second AP.

In an implementation, the channel quality comprises at least one of a received signal strength indicator (RSSI), a reference signal received power (RSRP), or a reference signal received quality (RSRQ).

In an implementation, the method further includes the following. After releasing the connection between the electronic device and the second AP, a plurality of fourth APs other than the third AP in a range where the electronic device is located are scanned. At least one fourth AP whose frequency band is different from a third frequency band of the third AP is determined from the plurality of fourth APs. Select from the at least one fourth AP as a target AP, the target AP meeting a preset condition. Access the target AP through the Wi-Fi communication module.

In an implementation, the preset condition comprises at least one of: an AP accessed by the electronic device previously; or an AP that can be accessed by the electronic device without login authentication.

In an implementation, the method further includes the following. After accessing the target AP through the Wi-Fi communication module, a notification is displayed according to a preset display strategy. The preset display strategy includes: displaying a banner notification at the top of a screen of the electronic device on condition that the electronic device is unlocked and a present interface is not an interface of a notification center, and hiding the banner notification and holding the banner notification at the notification center; displaying the notification at the notification center on condition that the electronic device is unlocked and the present interface is the interface of the notification center; or skipping sending the notification on condition that the electronic device is locked or screened off, and displaying the notification on condition that the target AP is in a connected state after the screen is turned on.

In an implementation, the method further includes the following. After displaying the notification according to the preset display strategy, jumping to a login authentication interface with the notification disappeared, in response to receiving a request for triggering the notification; or forbidding popping up the notification, on condition that the notification has been displayed for more than a preset period and the login authentication fails.

In an implementation, the method further includes the following. Prior to detecting the resource conflict between the third AP and the second AP, detect that the electronic device roams from the first AP to the third AP.

According to implementations of the disclosure, an electronic device is provided. The electronic device supports dual Wi-Fi. The electronic device includes a Wi-Fi communication module. The electronic device accesses a first AP and a second AP through the Wi-Fi communication module in a dual Wi-Fi state. A first frequency band of the first AP is different from a second frequency band of the second AP. The electronic device includes a processor and a memory. The memory is coupled to the processor and stores one or more programs. The programs include instructions which are operable with the processor to: detect that the electronic device roams from the first AP to a third AP; detect existence of a resource conflict between the third AP and the second AP; and release a connection between the electronic device and the second AP in response to detecting that the resource conflict exists between the third AP and the second AP.

In an implementation, the processor configured to detect existence of the resource conflict between the third AP and the second AP is configured to: obtain a third frequency band of the third AP; determine that the resource conflict exists between the third AP and the second AP in response to the third frequency band being identical with the second frequency band; and determine that no resource conflict exists between the third AP and the second AP in response to the third frequency band being different from the second frequency band.

In an implementation, the processor is further configured to: after obtaining the third frequency band of the third AP, detect a channel used by the third AP and a channel used by the second AP in response to the third frequency band being identical with the second frequency band; determine that the resource conflict exists between the third AP and the second AP in response to the channel used by the third AP being identical with the channel used by the second AP; and determine that no resource conflict exists between the third AP and the second AP in response to the channel used by the third AP being different from the channel used by the second.

In an implementation, a frequency band of the Wi-Fi communication module comprises a 2.4 GHz frequency band and a 5 GHz frequency band.

In an implementation, the processor configured to detect existence of the resource conflict between the third AP and the second AP is configured to: detect a channel quality of the third AP and a channel quality of the second AP; determine that the resource conflict exists between the third AP and the second AP in response to the channel quality of the third AP and the channel quality of the second AP being each less than a preset channel quality; and determine that no resource conflict exists between the third AP and the second AP in response to the channel quality of the third AP and/or the channel quality of the second AP being greater than or equal to the preset channel quality.

In an implementation, the processor is further configured to: after releasing the connection between the electronic device and the second AP, scan a plurality of fourth APs other than the third AP in a range where the electronic device is located; determine from the plurality of fourth APs at least one fourth AP whose frequency band is different from a third frequency band of the third AP; select from the at least one fourth AP as a target AP, the target AP meeting a preset condition; and access the target AP through the Wi-Fi communication module.

In an implementation, the preset condition comprises at least one of: an AP accessed by the electronic device previously; or an AP that can be accessed by the electronic device without login authentication.

In an implementation, the processor is further configured to display a notification according to a preset display strategy after accessing the target AP through the Wi-Fi communication module. The preset display strategy comprises: displaying a banner notification at the top of a screen of the electronic device on condition that the electronic device is unlocked and a present interface is not an interface of a notification center, and hiding the banner notification and holding the banner notification at the notification center; displaying the notification at the notification center on condition that the electronic device is unlocked and the present interface is the interface of the notification center; or skipping sending the notification on condition that the electronic device is locked or screened off, and displaying the notification on condition that the target AP is in a connected state after the screen is turned on.

In an implementation, the processor is further configured to: after displaying the notification according to the preset display strategy, jump to a login authentication interface with the notification disappeared, in response to receiving a request for triggering the notification; or forbid popping up the notification, on condition that the notification has been displayed for more than a preset period and the login authentication fails.

According to implementations of the disclosure, a non-transitory computer-readable storage medium is provided. The non-transitory computer-readable storage medium stores computer programs which, when executed by a processor, cause the processor to execute all or part of the operations of the method of the implementations of the disclosure.

Figure 1A:
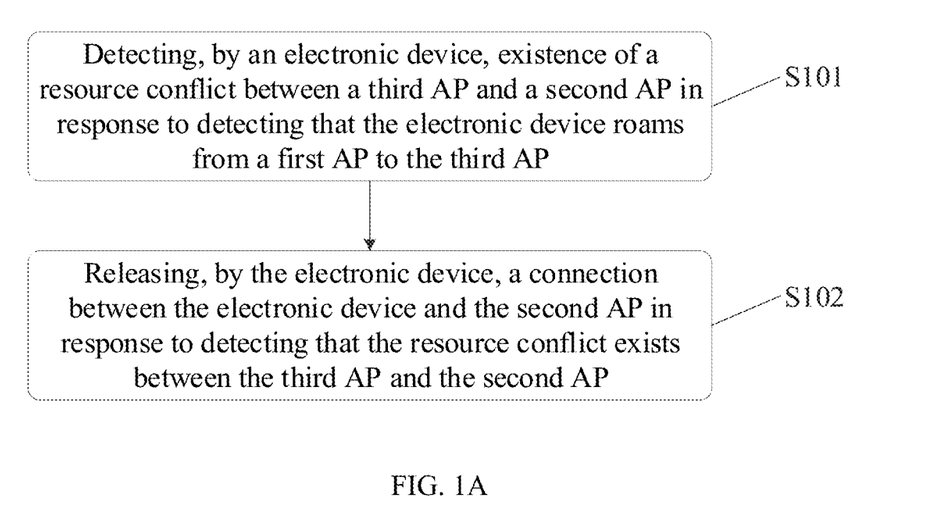
FIG. 1A is a schematic flowchart illustrating a wireless fidelity (Wi-Fi) connection control method provided in implementations of the disclosure.

Please refer to FIG. 1A, FIG. 1A is a schematic flowchart illustrating a Wi-Fi connection control method provided in implementations of the disclosure. The method is performed by an electronic device. The electronic device supports dual Wi-Fi. The electronic device includes a Wi-Fi communication module. In a dual Wi-Fi state, the electronic device accesses a first AP and a second AP through the Wi-Fi communication module. A first frequency band of the first AP is different from a second frequency band of the second AP. The method includes the following.

At S101, upon detecting that the electronic device roams from the first AP to a third AP, the electronic device detects existence of a resource conflict between the third AP and the second AP.

Upon detecting that the electronic device roams from the first AP to the third AP, a prompt message is outputted on a display screen of the electronic device.

At S102, upon detecting that the resource conflict exists between the third AP and the second AP, the electronic device releases a connection between the electronic device and the second AP.

After the connection between the electronic device and the second AP is released, the method further includes the following. After switching to single Wi-Fi, a mobile phone can implement multiplexing of two antennas corresponding to the dual Wi-Fi, to realize multiple-input and multiple-output (MIMO).

In implementations of the disclosure, a Wi-Fi connection control method and related products are provided, which are applied to the electronic device. The electronic device supports dual Wi-Fi and includes the Wi-Fi communication module. The electronic device accesses the first AP and the second AP through the Wi-Fi communication module in the dual Wi-Fi state. The first frequency band of the first AP is different from the second frequency band of the second AP. The method includes the following. Upon detecting that the electronic device roams from the first AP to the third AP, existence of the resource conflict between the third AP and the second AP is detected. Upon detecting that the resource conflict exists between the third AP and the second AP, the connection between the electronic device and the second AP is released. As can be seen, existence of a resource conflict between APs in the dual Wi-Fi state is detected, so as to selectively connect to different Wi-Fi, which can avoid a situation where each Wi-Fi connection enters a sleep mode after working for a period of time in the dual Wi-Fi state. As such, it is beneficial to increasing network speed and reducing network delay, thereby improving the efficiency and convenience of Wi-Fi connection control.

In one possible example, the electronic device detects existence of the resource conflict between the third AP and the second AP as follows. The electronic device obtains a third frequency band of the third AP. Upon detecting that the third frequency band is identical with the second frequency band, the electronic device determines that the resource conflict exists between the third AP and the second AP. Upon detecting that the third frequency band is different from the second frequency band, the electronic device determines that no resource conflict exists between the third AP and the second AP.

If the third frequency band is identical with the second frequency band, a third channel used by the third AP and a second channel used by the second AP are detected. If the third channel is different from the second channel, whether the third channel and the second channel are non-interfering channels is determined. If the third channel and the second channel are non-interfering channels, it is determined that no resource conflict exists between the third AP and the second AP.

In a specific implementation, a mobile phone accesses wlan0 and wlan1, if the mobile phone determines that both wlan0 and wlan1 have a 2.4 GHz frequency band, wlan0 uses a first channel, and wlan1 uses a sixth channel, then the mobile phone determines that the first channel and the sixth channel are non-interfering channels, and so the mobile phone determines that no resource conflict exists between wlan0 and wlan1.

In a specific implementation, the mobile phone accesses wlan0 and wlan1, if the mobile phone determines that wlan0 has a 5 GHz frequency band and wlan1 has a 2.4 GHz frequency band, then the mobile phone determines that no resource conflict exists between wlan0 and wlan1.

In a specific implementation, the mobile phone accesses wlan0 and wlan1, if the mobile phone determines that both wlan0 and wlan1 have a 2.4 GHz frequency band and both wlan0 and wlan1 use a sixth channel, then the mobile phone determines that the resource conflict exists between wlan0 and wlan1.

As can be seen, in this example, the electronic device obtains the third frequency band of the third AP. Upon detecting that the third frequency band is identical with the second frequency band, the electronic device determines that the resource conflict exists between the third AP and the second AP. Upon detecting that the third frequency band is different from the second frequency band, the electronic device determines that no resource conflict exists between the third AP and the second AP. Existence of the resource conflict between the third AP and the second AP is determined, so that when the resource conflict exists, a Wi-Fi connection can be controlled effectively and conveniently by performing a corresponding operation, which is beneficial to realizing a high-speed and smooth network.

In one possible example, a frequency band of the Wi-Fi communication module of the electronic device includes a 2.4 GHz frequency band and a 5 GHz frequency band.

In one possible example, the electronic device detects existence of the resource conflict between the third AP and the second AP as follows. The electronic device detects a channel quality of the third AP and a channel quality of the second AP. Upon detecting that the channel quality of the third AP and the channel quality of the second AP are each less than a preset channel quality, the electronic device determines that the resource conflict exists between the third AP and the second AP. Upon detecting that the channel quality of the third AP and/or the channel quality of the second AP is greater than or equal to the preset channel quality, the electronic device determines that no resource conflict exists between the third AP and the second AP.

The preset channel quality herein may include a preset received signal strength indicator (RSSI), a preset reference signal received power (RSRP), and a preset reference signal received quality (RSRQ).

In a specific implementation, a mobile phone detects that AP1 has channel quality M1 and AP2 has channel quality M2, if the mobile phone detects that both M1 and M2 are less than preset channel quality M0, the mobile phone determines that the resource conflict exists between AP1 and AP2.

In a specific implementation, the mobile phone detects that AP3 has channel quality M3 and AP4 has channel quality M4, if the mobile phone detects that both M3 and M4 are greater than the preset channel quality M0, the mobile phone determines that no resource conflict exists between AP3 and AP4.

As can be seen, in this example, the electronic device detects the channel quality of the third AP and the channel quality of the second AP. If the channel quality of the third AP and the channel quality of the second AP are each less than the preset channel quality, the electronic device determines that the resource conflict exists between the third AP and the second AP. If the channel quality of the third AP and/or the channel quality of the second AP is greater than or equal to the preset channel quality, the electronic device determines that no resource conflict exists between the third AP and the second AP. The channel quality of the third AP and the channel quality of the second AP are detected, which is beneficial to efficiently and accurately determining existence of the resource conflict between the third AP and the second AP, so as to control and adjust a Wi-Fi connection conveniently and quickly.

In one possible example, the channel quality includes at least one of an RSSI, an RSRP, or an RSRQ.

In one possible example, after the electronic device releases the connection between the electronic device and the second AP, the method further includes the following. The electronic device scans multiple fourth APs other than the third AP in a range where the electronic device is located. The electronic device determines from the multiple fourth APs at least one fourth AP whose frequency band is different from a third frequency band of the third AP. The electronic device selects from the at least one fourth AP as a target AP, where the target AP meets a preset condition. The electronic device accesses the target AP through the Wi-Fi communication module to maintain dual Wi-Fi.

The range where the electronic device is located may be a range of 300 meters on condition that the electronic device is in an open environment with no obstruction, or a range of 100 meters on condition that the electronic device is in an environment with many obstructions.

After the electronic device accesses the target AP through the Wi-Fi communication module, the electronic device displays a notification according to a preset display strategy.

Specifically, the preset display strategy includes: displaying a banner notification at the top of a screen of the electronic device on condition that the electronic device is unlocked and a present interface is not an interface of a notification center, and hiding the banner notification automatically three seconds later and holding the banner notification at the notification center; displaying the notification at the notification center on condition that the electronic device is unlocked and the present interface is the interface of the notification center; or skipping sending the notification on condition that the electronic device is locked and/or screened off, and displaying the notification on condition that the target AP is in a connected state after the screen is turned on.

After the electronic device displays the notification according to the preset display strategy, the method further includes the following. Upon receiving a request for triggering the notification, jump to a login authentication interface with the notification disappeared. Alternatively, on condition that the notification has been displayed for more than ten minutes and the login authentication fails, forbid popping up the notification for ten minutes.

Figure 1B:
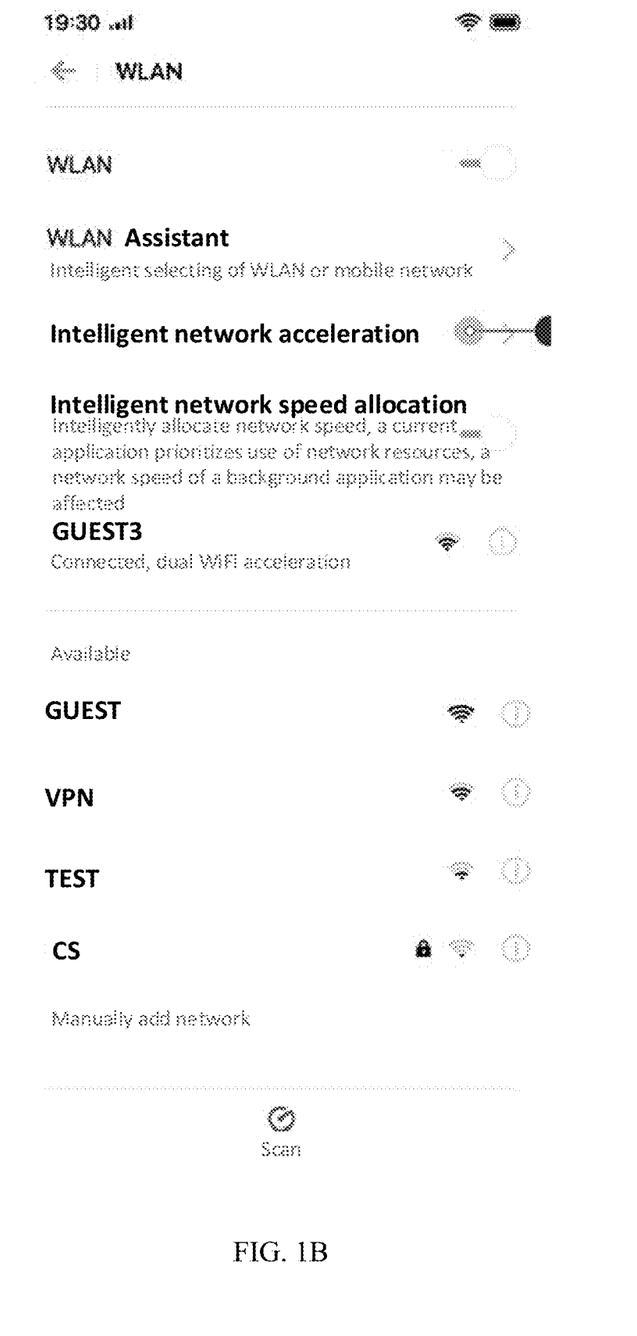
FIG. 1B is a schematic diagram illustrating a Wi-Fi scan connection interface provided in implementations of the disclosure.
Figure 1C:
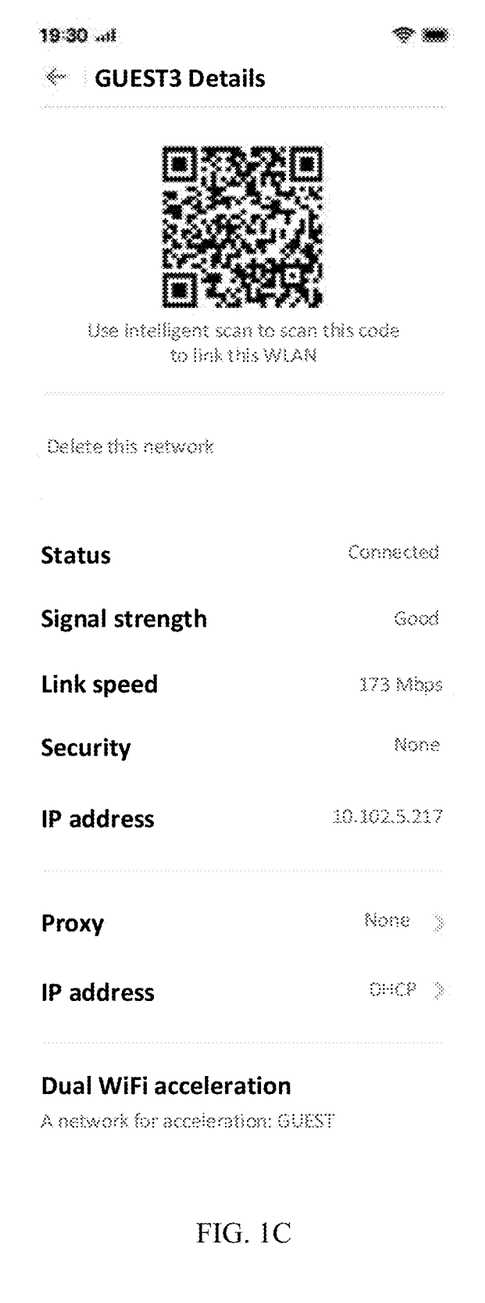
FIG. 1C is a schematic diagram illustrating an interface of Wi-Fi connection details provided in implementations of the disclosure.

In a specific implementation, as illustrated in FIG. 1B, after a mobile phone releases a connection between the mobile phone and "GUEST2", the mobile phone scans multiple APs (e.g., "VPN", "TEST", "CS", and "GUEST") other than "GUEST3" in a range where the mobile phone is located. The mobile phone determines from the multiple APs an AP (e.g., "GUEST") whose frequency band is different from a frequency band of "GUEST2". The mobile phone accesses "GUEST" through a Wi-Fi communication module to maintain dual Wi-Fi. In this case, the mobile phone accesses "GUEST3" and "GUEST" at the same time, and an interface of Wi-Fi connection details is illustrated in FIG. 1C.

Figure 1D:
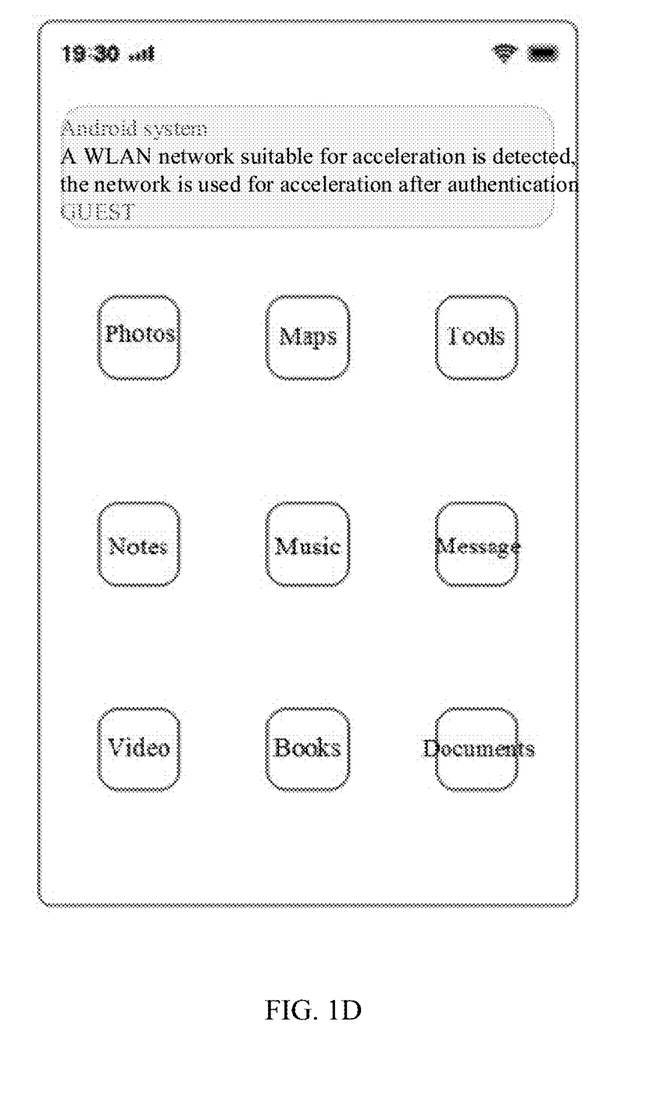
FIG. 1D is a schematic diagram illustrating an interface of displaying of an authentication notification provided in implementations of the disclosure.

In a specific implementation, as illustrated in FIG. 1D, if a mobile phone is unlocked and a present interface is a main desktop, after accessing "GUEST" through the Wi-Fi communication module, a banner is displayed at the top of a screen of the mobile phone to send a notification of GUEST authentication. The banner is hidden automatically three seconds later, and is held at a notification center.

As can be seen, in this example, the electronic device scans the multiple fourth APs other than the third AP in the range where the electronic device is located. The electronic device determines from the multiple fourth APs the at least one fourth AP whose frequency band is different from the third frequency band. The electronic device selects the target AP that meets the preset condition. The electronic device accesses the target AP through the Wi-Fi communication module to maintain dual Wi-Fi. As such, it is beneficial to improving flexibility and efficiency of Wi-Fi connection control.

In one possible example, the preset condition includes at least one of: an AP accessed by the electronic device previously, or an AP that can be accessed by the electronic device without login authentication.

Figure 2:
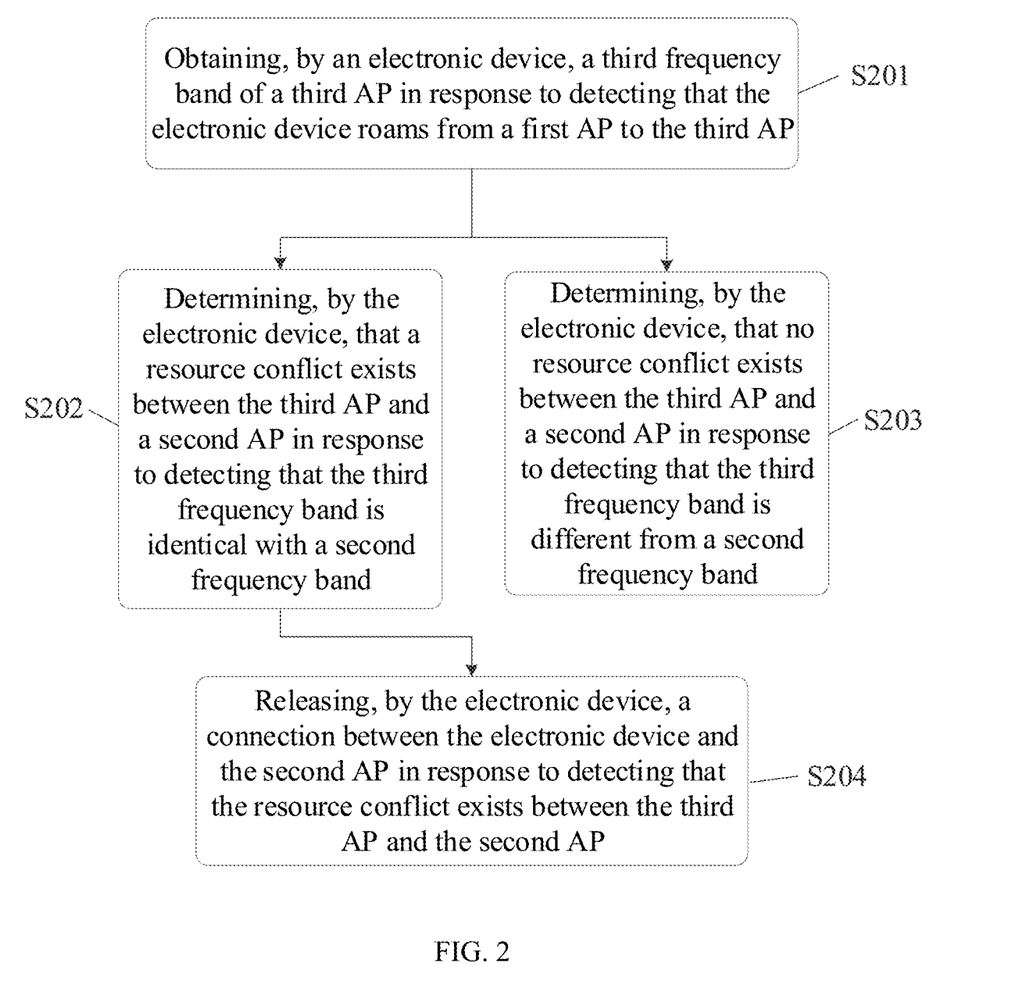
FIG. 2 is a schematic flowchart illustrating a Wi-Fi connection control method provided in other implementations of the disclosure.

Similar to the foregoing implementations described with reference to FIG. 1A, please refer to FIG. 2, FIG. 2 is a schematic flowchart illustrating a Wi-Fi connection control method provided in implementations of the disclosure. The method is performed by an electronic device. The electronic device supports dual Wi-Fi. The electronic device includes a Wi-Fi communication module. In a dual Wi-Fi state, the electronic device accesses a first AP and a second AP through the Wi-Fi communication module. A first frequency band of the first AP is different from a second frequency band of the second AP. As illustrated in FIG. 2, the Wi-Fi connection control method includes the following.

At S201, upon detecting that the electronic device roams from the first AP to a third AP, the electronic device obtains a third frequency band of the third AP.

At S202, upon detecting that the third frequency band is identical with the second frequency band, the electronic device determines that a resource conflict exists between the third AP and the second AP.

At S203, upon detecting that the third frequency band is different from the second frequency band, the electronic device determines that no resource conflict exists between the third AP and the second AP.

At S204, upon detecting that the resource conflict exists between the third AP and the second AP, the electronic device releases a connection between the electronic device and the second AP.

In implementations of the disclosure, a Wi-Fi connection control method and related products are provided, which are applied to the electronic device. The electronic device supports dual Wi-Fi and includes the Wi-Fi communication module. The electronic device accesses the first AP and the second AP through the Wi-Fi communication module in the dual Wi-Fi state. The first frequency band of the first AP is different from the second frequency band of the second AP. The method includes the following. Upon detecting that the electronic device roams from the first AP to the third AP, existence of the resource conflict between the third AP and the second AP is detected. Upon detecting that the resource conflict exists between the third AP and the second AP, the connection between the electronic device and the second AP is released. As can be seen, existence of a resource conflict between APs in the dual Wi-Fi state is detected, so as to selectively connect to different Wi-Fi, which can avoid a situation where each Wi-Fi connection enters a sleep mode after working for a period of time in the dual Wi-Fi state. As such, it is beneficial to increasing network speed and reducing network delay, thereby improving the efficiency and convenience of Wi-Fi connection control.

In addition, the electronic device obtains the third frequency band of the third AP. Upon detecting that the third frequency band is identical with the second frequency band, the electronic device determines that the resource conflict exists between the third AP and the second AP. Upon detecting that the third frequency band is different from the second frequency band, the electronic device determines that no resource conflict exists between the third AP and the second AP. Existence of the resource conflict between the third AP and the second AP is determined, so that when the resource conflict exists, a Wi-Fi connection can be controlled effectively and conveniently by performing a corresponding operation, which is beneficial to realizing a high-speed and smooth network.

Figure 3:
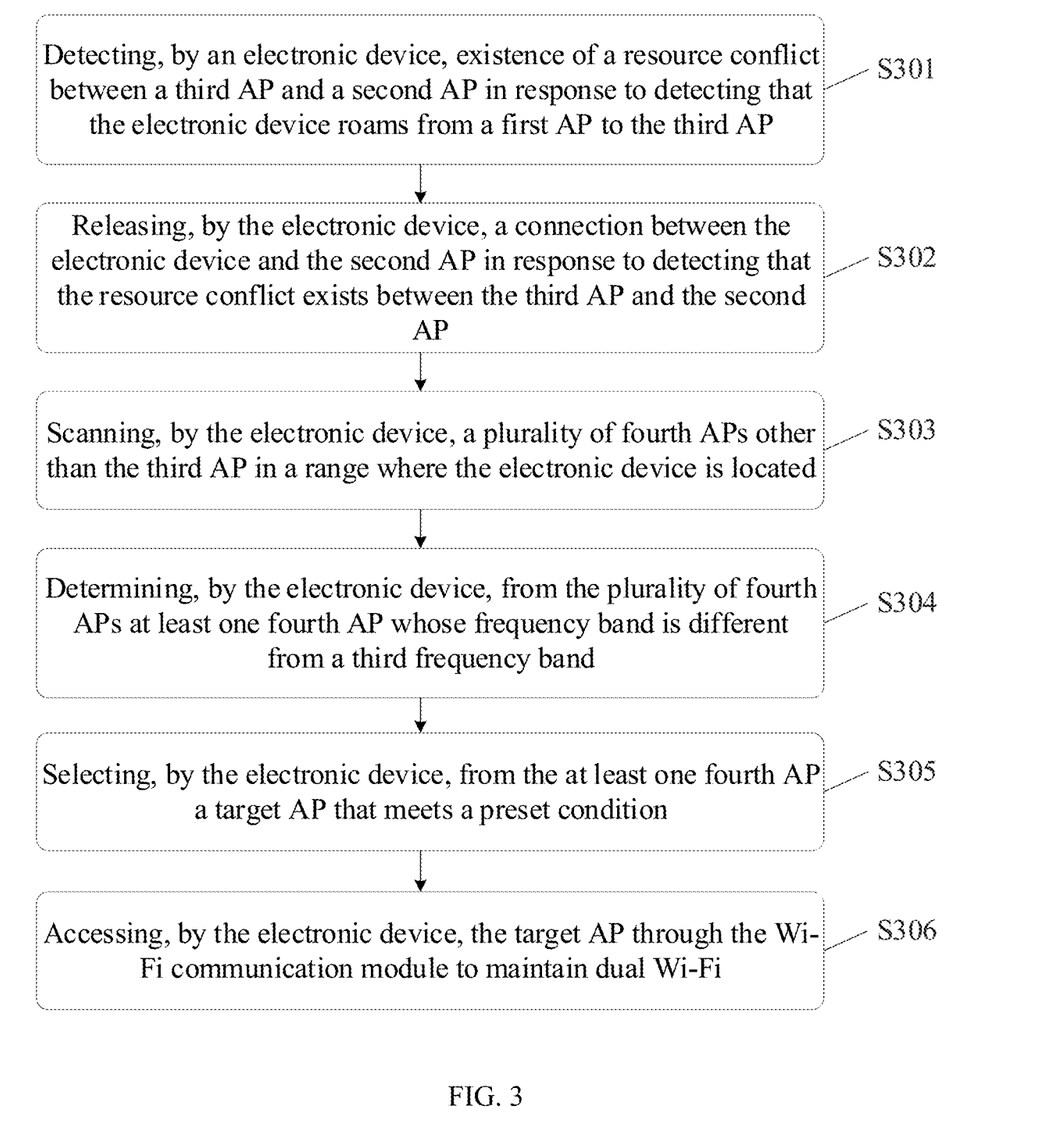
FIG. 3 is a schematic flowchart illustrating a Wi-Fi connection control method provided in other implementations of the disclosure.

Similar to the foregoing implementations described with reference to FIG. 1A, please refer to FIG. 3. FIG. 3 is a schematic flowchart illustrating a Wi-Fi connection control method provided in implementations of the disclosure. The method is performed by an electronic device. The electronic device supports dual Wi-Fi. The electronic device includes a Wi-Fi communication module. In a dual Wi-Fi state, the electronic device accesses a first AP and a second AP through the Wi-Fi communication module. A first frequency band of the first AP is different from a second frequency band of the second AP. As illustrated in the FIG. 3, the Wi-Fi connection control method includes the following.

At S301, upon detecting that the electronic device roams from the first AP to a third AP, the electronic device detects existence of a resource conflict between the third AP and the second AP.

At S302, upon detecting that the resource conflict exists between the third AP and the second AP, the electronic device releases a connection between the electronic device and the second AP.

At S303, the electronic device scans multiple fourth APs other than the third AP in a range where the electronic device is located.

At S304, the electronic device determines from the multiple fourth APs at least one fourth AP whose frequency band is different from a third frequency band of the third AP.

At S305, the electronic device selects from the at least one fourth AP a target AP that meets a preset condition.

At S306, the electronic device accesses the target AP through the Wi-Fi communication module to maintain dual Wi-Fi.

In implementations of the disclosure, a Wi-Fi connection control method and related products are provided, which are applied to the electronic device. The electronic device supports dual Wi-Fi and includes the Wi-Fi communication module. The electronic device accesses the first AP and the second AP through the Wi-Fi communication module in the dual Wi-Fi state. The first frequency band of the first AP is different from the second frequency band of the second AP. The method includes the following. Upon detecting that the electronic device roams from the first AP to the third AP, existence of the resource conflict between the third AP and the second AP is detected. Upon detecting that the resource conflict exists between the third AP and the second AP, the connection between the electronic device and the second AP is released. As can be seen, existence of a resource conflict between APs in the dual Wi-Fi state is detected, so as to selectively connect to different Wi-Fi, which can avoid a situation where each Wi-Fi connection enters a sleep mode after working for a period of time in the dual Wi-Fi state. As such, it is beneficial to increasing network speed and reducing network delay, thereby improving the efficiency and convenience of Wi-Fi connection control.

In addition, the electronic device scans the multiple fourth APs other than the third AP in the range where the electronic device is located. The electronic device determines from the multiple fourth APs the at least one fourth AP whose frequency band is different from the third frequency band. The electronic device selects the target AP that meets the preset condition. The electronic device accesses the target AP through the Wi-Fi communication module to maintain dual Wi-Fi. As such, it is beneficial to improving flexibility and efficiency of Wi-Fi connection control.

Figure 4:
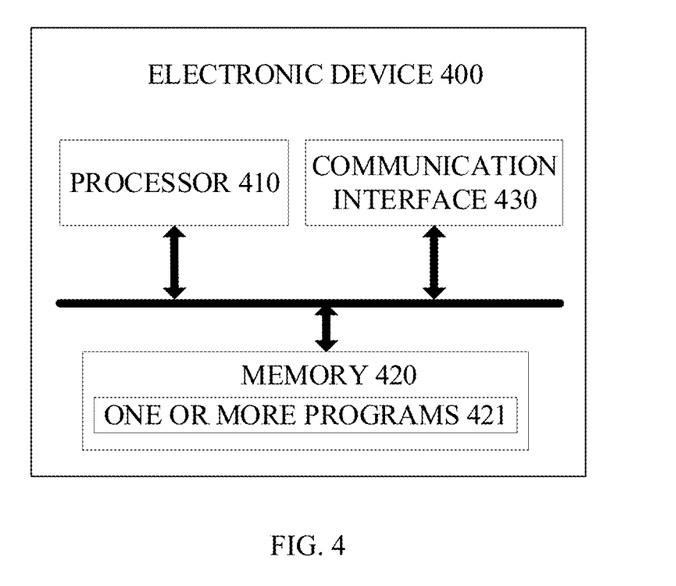
FIG. 4 is a schematic structural diagram illustrating an electronic device provided in implementations of the disclosure.

Similar to the foregoing implementations described with reference to FIG. 1A, FIG. 2, and FIG. 3, please refer to FIG. 4, FIG. 4 is a schematic structural diagram illustrating an electronic device 400 provided in implementations of the disclosure. The electronic device 400 supports dual Wi-Fi and includes a Wi-Fi communication module. The electronic device 400 accesses a first AP and a second AP through the Wi-Fi communication module in a dual Wi-Fi state. A first frequency band of the first AP is different from a second frequency band of the second AP. As illustrated in FIG. 4, the electronic device 400 includes a processor 410 (e.g., an application processor), a memory 420, a communication interface 430, and one or more programs 421. The one or more programs 421 are stored in the memory 420 and configured to be executed by the processor 410. The one or more programs 421 include instructions which are operable with the processor to carry out the following actions. In response to detecting that the electronic device roams from a first AP to a third AP, existence of a resource conflict between the third AP and a second AP is detected. In response to detecting that the resource conflict exists between the third AP and the second AP, a connection between the electronic device and the second AP is released.

In implementations of the disclosure, a Wi-Fi connection control method and related products are provided, which are applied to the electronic device. The electronic device supports dual Wi-Fi and includes the Wi-Fi communication module. The electronic device accesses the first AP and the second AP through the Wi-Fi communication module in the dual Wi-Fi state. The first frequency band of the first AP is different from the second frequency band of the second AP. The method includes the following. In response to detecting that the electronic device roams from the first AP to the third AP, existence of the resource conflict between the third AP and the second AP is detected. In response to detecting that the resource conflict exists between the third AP and the second AP, the connection between the electronic device and the second AP is released. As can be seen, existence of a resource conflict between APs in the dual Wi-Fi state is detected, so as to selectively connect to different Wi-Fi, which can avoid a situation where each Wi-Fi connection enters a sleep mode after working for a period of time in the dual Wi-Fi state. As such, it is beneficial to increasing network speed and reducing network delay, thereby improving the efficiency and convenience of Wi-Fi connection control.

In one possible example, the instructions of the programs operable with the processor to detect existence of the resource conflict between the third AP and the second AP are specifically operable with the processor to carry out the following actions. A third frequency band of the third AP is obtained. In response to detecting that the third frequency band is identical with the second frequency band, determine that the resource conflict exists between the third AP and the second AP. In response to detecting that the third frequency band is different from the second frequency band, determine that no resource conflict exists between the third AP and the second AP.

In one possible example, the instructions of the programs operable with the processor to detect existence of the resource conflict between the third AP and the second AP are specifically operable with the processor to carry out the following actions. A channel quality of the third AP and a channel quality of the second AP are detected. In response to detecting that the channel quality of the third AP and the channel quality of the second AP are each less than a preset channel quality, determine that the resource conflict exists between the third AP and the second AP. In response to detecting that the channel quality of the third AP and/or the channel quality of the second AP is greater than or equal to the preset channel quality, determine that no resource conflict exists between the third AP and the second AP.

In one possible example, the instructions of the programs are further operable with the processor to carry out the following actions. After releasing the connection between the electronic device and the second AP, multiple fourth APs other than the third AP in a range where the electronic device is located are scanned. At least one fourth AP whose frequency band is different from a third frequency band is determined from the multiple fourth APs. A target AP that meets a preset condition is selected from the at least one fourth AP. The target AP is accessed through the Wi-Fi communication module to maintain dual Wi-Fi.

The foregoing technical solutions of the implementations of the disclosure are mainly described from the viewpoint of execution of the method. It can be understood that, in order to implement the above functions, the electronic device includes hardware structures and/or software modules corresponding to the respective functions. Those skilled in the art should readily recognize that, in combination with the exemplary units and scheme steps or operations described in the implementations disclosed herein, the disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the disclosure.

According to the implementations of the disclosure, functional units may be divided for the electronic device in accordance with the foregoing method examples. For example, functional units may be divided according to corresponding functions, and two or more functions may be integrated into one processing unit. The above-mentioned integrated unit can be implemented in the form of hardware or software functional units. It should be noted that the division of units in the implementations of the disclosure is schematic and is merely a logical function division; there may be other division manners in actual implementation.

Figure 5:
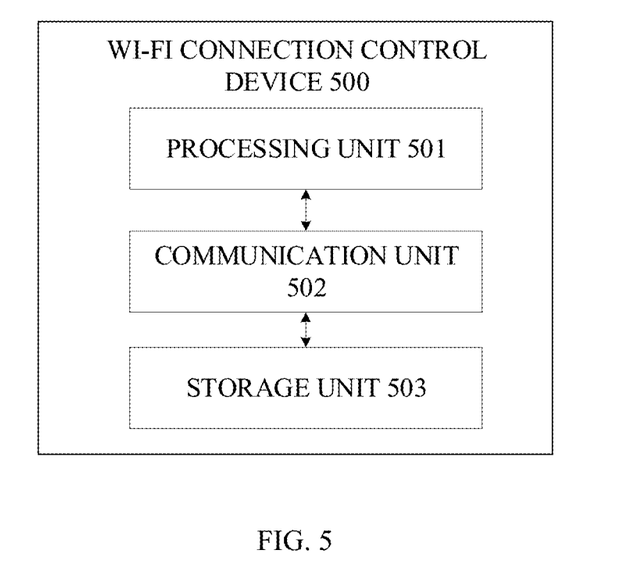
FIG. 5 is a block diagram illustrating functional units of a Wi-Fi connection control device provided in implementations of the disclosure.

FIG. 5 is a block diagram illustrating functional units of a Wi-Fi connection control device 500 provided in implementations of the disclosure. The Wi-Fi connection control device 500 is applied to an electronic device. The electronic device supports dual Wi-Fi and includes a Wi-Fi communication module. The electronic device accesses a first AP and a second AP through the Wi-Fi communication module in a dual Wi-Fi state. A first frequency band of the first AP is different from a second frequency band of the second AP. The Wi-Fi connection control device 500 includes a processing unit 501, a communication unit 502, and a storage unit 503. The processing unit 501 is configured to detect existence of a resource conflict between a third AP and a second AP in response to detecting that the electronic device roams from a first AP to the third AP. The processing unit 501 is configured to release a connection between the electronic device and the second AP in response to detecting that the resource conflict exists between the third AP and the second AP.

In implementations of the disclosure, a Wi-Fi connection control method and related products are provided, which are applied to the electronic device. The electronic device supports dual Wi-Fi and includes the Wi-Fi communication module. The electronic device accesses the first AP and the second AP through the Wi-Fi communication module in the dual Wi-Fi state. The first frequency band of the first AP is different from the second frequency band of the second AP. The method includes the following. In response to detecting that the electronic device roams from the first AP to the third AP, existence of the resource conflict between the third AP and the second AP is detected. In response to detecting that the resource conflict exists between the third AP and the second AP, the connection between the electronic device and the second AP is released. As can be seen, existence of a resource conflict between APs in the dual Wi-Fi state is detected, so as to selectively connect to different Wi-Fi, which can avoid a situation where each Wi-Fi connection enters a sleep mode after working for a period of time in the dual Wi-Fi state. As such, it is beneficial to increasing network speed and reducing network delay, thereby improving the efficiency and convenience of Wi-Fi connection control.

In one possible example, the processing unit 501 configured to detect existence of the resource conflict between the third AP and the second AP is specifically configured to: obtain a third frequency band of the third AP; determine that the resource conflict exists between the third AP and the second AP in response to detecting that the third frequency band is identical with the second frequency band; and determine that no resource conflict exists between the third AP and the second AP in response to detecting that the third frequency band is different from the second frequency band.

In one possible example, the processing unit 501 configured to detect existence of the resource conflict between the third AP and the second AP is specifically configured to: detect a channel quality of the third AP and a channel quality of the second AP; determine that the resource conflict exists between the third AP and the second AP in response to detecting that the channel quality of the third AP and the channel quality of the second AP are each less than a preset channel quality; and determine that no resource conflict exists between the third AP and the second AP in response to detecting that the channel quality of the third AP and/or the channel quality of the second AP is greater than or equal to the preset channel quality.

In one possible example, the processing unit 501 is further configured to: scan multiple fourth APs other than the third AP in a range where the electronic device is located, after releasing the connection between the electronic device and the second AP; determine from the multiple fourth APs at least one fourth AP whose frequency band is different from a third frequency band; select from the at least one fourth AP a target AP that meets a preset condition; and access the target AP through the Wi-Fi communication module to maintain dual Wi-Fi.

According to implementations of the disclosure, a non-transitory computer-readable storage medium is further provided. The non-transitory computer-readable storage medium stores computer programs for electronic data interchange. The computer programs cause a computer to execute all or part of the operations of the method described in the foregoing method implementations. The computer may include an electronic device.

According to implementations of the disclosure, a computer program product is further provided. The computer program product includes a non-transitory computer-readable storage medium configured to store computer programs. The computer programs are operable with a computer to execute all or part of the operations of the method described in the foregoing method implementations. The computer program product may be a software installation package, and the computer may include an electronic device.

It is to be noted that, for the sake of simplicity, the foregoing method implementations are described as a series of action combinations, however, it will be appreciated by those skilled in the art that the disclosure is not limited by the sequence of actions described. That is because that, according to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the device/apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software program module.

The integrated unit may be stored in a computer-readable memory when it is implemented in the form of a software program module and is sold or used as a separate product.

Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to execute all or part of the operations of the method described in the various implementations of the disclosure. The memory includes various medium capable of storing program codes, such as a universal serial bus (USB), a read-only memory (ROM), a random access memory (RAM), a removable hard disk, disk, compact disc (CD), or the like.

It will be understood by those of ordinary skill in the art that all or part of the operations of the method of the implementations described above may be accomplished by means of a program to instruct associated hardware, the program may be stored in a computer-readable memory, which may include a flash memory, a ROM, a RAM, disk or CD, and so on.

While the principles and the implementations of the disclosure have been described in connection with illustrative examples, it is to be understood that foregoing implementations are merely used to help understand the method and the core idea of the disclosure. As will occur to those skilled in the art, the disclosure is susceptible to various modifications and changes without departing from the spirit and principle of the disclosure. Therefore, the disclosure is not to be limited to the disclosed implementations.

What is claimed is:

1. A wireless fidelity (Wi-Fi) connection control method, performed by an electronic device supporting dual Wi-Fi and comprising a Wi-Fi communication module, the electronic device accessing a first access point (AP) and a second AP through the Wi-Fi communication module in a dual Wi-Fi state, a first frequency band of the first AP being different from a second frequency band of the second AP, the method comprising:
    detecting an existence of a resource conflict between a third AP and the second AP in response to detecting that the electronic device roams from the first AP to the third AP;
    releasing a connection between the electronic device and the second AP in response to detecting that the resource conflict exists between the third AP and the second AP;
    scanning a plurality of fourth APs other than the third AP in a range where the electronic device is located;
    determining from the plurality of fourth APs at least one fourth AP whose frequency band is different from a third frequency band of the third AP;
    selecting from the at least one fourth AP as a target AP, the target AP meeting a preset condition; and
    accessing the target AP through the Wi-Fi communication module to maintain dual Wi-Fi;
    wherein the preset condition comprises at least one of: an AP accessed by the electronic device previously; or an AP that can be accessed by the electronic device without login authentication.

2. The method of claim 1, wherein detecting the existence of the resource conflict between the third AP and the second AP comprises:
    obtaining a third frequency band of the third AP;
    determining that the resource conflict exists between the third AP and the second AP in response to the third frequency band being identical with the second frequency band.

3. The method of claim 2, wherein a frequency band of the Wi-Fi communication module comprises a 2.4 GHz frequency band and a 5 GHz frequency band.

4. The method of claim 1, wherein detecting the existence of the resource conflict between the third AP and the second AP comprises:
    detecting a channel quality of the third AP and a channel quality of the second AP;
    determining that the resource conflict exists between the third AP and the second AP in response to the channel quality of the third AP and the channel quality of the second AP being each less than a preset channel quality.

5. The method of claim 4, wherein the channel quality comprises at least one of a received signal strength indicator (RSSI), a reference signal received power (RSRP), or a reference signal received quality (RSRQ).

6. The method of claim 1, further comprising:
    displaying a notification according to a preset display strategy after accessing the target AP through the Wi-Fi communication module, wherein the preset display strategy comprises:
        displaying a banner notification at a top of a screen of the electronic device on condition that the electronic device is unlocked and a present interface is not an interface of a notification center, and hiding the banner notification and holding the banner notification at the notification center;
        displaying the notification at the notification center on condition that the electronic device is unlocked and the present interface is the interface of the notification center; or
        skipping sending the notification on condition that the electronic device is locked or screened off, and displaying the notification on condition that the target AP is in a connected state after the screen is turned on.

7. The method of claim 6, further comprising:
    after displaying the notification according to the preset display strategy,
        jumping to a login authentication interface with the notification disappeared, in response to receiving a request for triggering the notification; or
        forbidding popping up the notification, on condition that the notification has been displayed for more than a preset period and the login authentication fails.

8. An electronic device, supporting dual wireless fidelity (Wi-Fi) and comprising a Wi-Fi communication module, the electronic device accessing a first access point (AP) and a second AP through the Wi-Fi communication module in a dual Wi-Fi state, a first frequency band of the first AP being different from a second frequency band of the second AP, the electronic device comprising:
    a processor; and
    a memory, coupled to the processor and storing one or more programs; the programs comprising instructions which are operable with the processor to:
    detect an existence of a resource conflict between the third AP and the second AP in response to detecting that the electronic device roams from the first AP to the third AP;
    release a connection between the electronic device and the second AP in response to detecting that the resource conflict exists between the third AP and the second AP;
    scan a plurality of fourth APs other than the third AP in a range where the electronic device is located;

determine from the plurality of fourth APs at least one fourth AP whose frequency band is different from a third frequency band of the third AP;

select from the at least one fourth AP as a target AP, the target AP meeting a preset condition; and access the target AP through the Wi-Fi communication module to maintain dual Wi-Fi;

wherein the preset condition comprises at least one of: an AP accessed by the electronic device previously; or an AP that can be accessed by the electronic device without login authentication.

9. The electronic device of claim 8, wherein the processor configured to detect the existence of the resource conflict between the third AP and the second AP is configured to:

obtain a third frequency band of the third AP;

determine that the resource conflict exists between the third AP and the second AP in response to the third frequency band being identical with the second frequency band; and determine that no resource conflict exists between the third AP and the second AP in response to the third frequency band being different from the second frequency band.

10. The electronic device of claim 9, wherein the processor is further configured to:

after obtaining the third frequency band of the third AP,
detect a channel used by the third AP and a channel used by the second AP in response to the third frequency band being identical with the second frequency band;

determine that the resource conflict exists between the third AP and the second AP in response to the channel used by the third AP being identical with the channel used by the second AP; and determine that no resource conflict exists between the third AP and the second AP in response to the channel used by the third AP being different from the channel used by the second.

11. The electronic device of claim 9, wherein a frequency band of the Wi-Fi communication module comprises a 2.4 GHz frequency band and a 5 GHz frequency band.

12. The electronic device of claim 8, wherein the processor configured to detect the existence of the resource conflict between the third AP and the second AP is configured to:

detect a channel quality of the third AP and a channel quality of the second AP;

determine that the resource conflict exists between the third AP and the second AP in response to the channel quality of the third AP and the channel quality of the second AP being each less than a preset channel quality; and determine that no resource conflict exists between the third AP and the second AP in response to the channel quality of the third AP and/or the channel quality of the second AP being greater than or equal to the preset channel quality.

13. The electronic device of claim 8, wherein the processor is further configured to:

display a notification according to a preset display strategy after accessing the target AP through the Wi-Fi communication module, wherein the preset display strategy comprises:

displaying a banner notification at a top of a screen of the electronic device on condition that the electronic device is unlocked and a present interface is not an interface of a notification center, and hiding the banner notification and holding the banner notification at the notification center;

displaying the notification at the notification center on condition that the electronic device is unlocked and the present interface is the interface of the notification center; or skipping sending the notification on condition that the electronic device is locked or screened off, and displaying the notification on condition that the target AP is in a connected state after the screen is turned on.

14. The electronic device of claim 13, wherein the processor is further configured to:

after displaying the notification according to the preset display strategy,
jump to a login authentication interface with the notification disappeared, in response to receiving a request for triggering the notification; or forbid popping up the notification, on condition that the notification has been displayed for more than a preset period and the login authentication fails.

15. A non-transitory computer-readable storage medium storing computer programs which, when executed by a processor of an electronic device, cause the processor to carry out actions, comprising:

detecting an existence of a resource conflict between a third access point (AP) and a second AP in response to detecting that the electronic device roams from the first AP to the third AP, the electronic device supporting dual wireless fidelity (Wi-Fi) and comprising a Wi-Fi communication module, the electronic device accessing a first AP and the second AP through the Wi-Fi communication module in a dual Wi-Fi state, a first frequency band of the first AP being different from a second frequency band of the second AP;

releasing a connection between the electronic device and the second AP in response to detecting that the resource conflict exists between the third AP and the second AP;

scanning a plurality of fourth APs other than the third AP in a range where the electronic device is located;

determining from the plurality of fourth APs at least one fourth AP whose frequency band is different from a third frequency band of the third AP;

selecting from the at least one fourth AP as a target AP, the target AP meeting a preset condition; and accessing the target AP through the Wi-Fi communication module to maintain dual Wi-Fi;

wherein the preset condition comprises at least one of: an AP accessed by the electronic device previously; or an AP that can be accessed by the electronic device without login authentication.

* * * * *